UNITED STATES PATENT OFFICE.

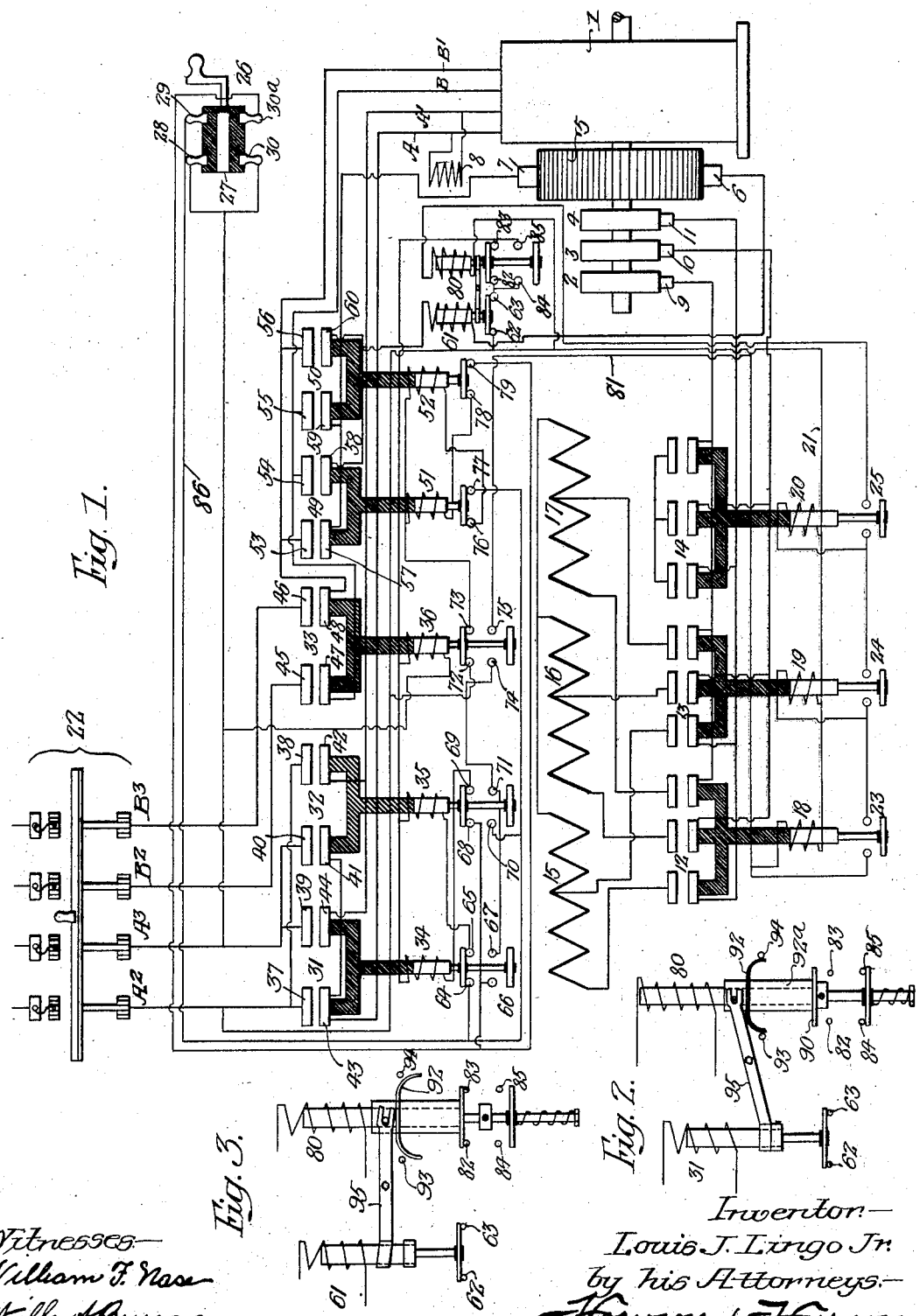

LOUIS J. LINGO, JR., OF WILMINGTON, DELAWARE, ASSIGNOR OF ONE-HALF TO ROBERT W. SMITH, OF WILMINGTON, DELAWARE.

SYSTEM OF MOTOR CONTROL.

1,016,754.     Specification of Letters Patent.     Patented Feb. 6, 1912.

Application filed October 5, 1911. Serial No. 652,947.

*To all whom it may concern:*

Be it known that I, LOUIS J. LINGO, Jr., a citizen of the United States, and a resident of Wilmington, Newcastle county, Delaware, have invented certain Improvements in Systems of Motor Control, of which the following is a specification.

One object of my invention is to provide a system of apparatus and the necessary connections, for use in connection with a polyphase alternating current motor, whereby such motor may be dynamically braked;—that is, after the line current has been cut off from it, to so alter or modify the connections of the various parts as to cause the motor to act as a generator of current with the result that a retarding force is exerted on the armature and on the apparatus connected thereto which quickly brings the same to rest.

It is further desired to provide a system of apparatus which in additon to securing the above noted object, shall be so arranged and connected as to operate automatically whenever the master controller or the device governing the operation of the motor, is moved to a predetermined position.

The invention also contemplates the provision of novel means for causing the braking action to occur with certainty whenever the master or other controller is manipulated in a predetermined manner; and it is also desired that the apparatus shall include means for effectually preventing entrance of line current to the apparatus when it is temporarily connected for braking; the arrangement of parts being such that it is a practical impossibility for braking connections to be made when line current is being supplied to them. I further desire that the apparatus for accomplishing the above desired end shall be of a thoroughly practical, reliable and efficient nature, as well as capable of being conveniently and inexpensively attached to and used in connection with alternating current motors of standard types and particularly those having closed circuit armatures.

Another object of my invention is to provide a system of apparatus for dynamically braking polyphase induction motors having a commutator and brushes, which shall include apparatus whereby these latter elements are utilized only at such times as the motor is connected for braking.

These objects and other advantageous ends I secure as hereinafter set forth, reference being had to the accompanying drawings, in which;—

Figure 1, is a diagrammatic representation of the apparatus constituting my invention; and Figs. 2 and 3, are diagrammatic views showing the detail arrangement of certain of the switch mechanism forming part of my invention.

In the above drawings, 1 represents an alternating current motor which in the present instance is illustrated as of the two-phase type, and having three slip rings 2, 3 and 4 connected in the well known way to its armature.

For the purpose of my invention I employ or provide the motor with a commutator 5 connected to the windings of the armature in the manner well understood in direct current practice; it being noted that the armature is of the closed circuit type. Said commutator is provided with a pair of brushes 6 and 7 and with any desired mechanism (not shown) whereby a solenoid 8 is capable, when energized, of moving said brushes out of engagement with it. The solenoid 8 is connected across the two conductors A and A' of one phase, so that whenever they are supplied with current from the line, the solenoid A is energized and is caused to maintain the brushes 6 and 7 out of engagement with the commutator 5. The slip rings are respectively engaged by brushes 9, 10, and 11, each connected to three contacts, each of which forms respectively one element of one of three switches 12, 13, and 14. These switches are of the three-pole type and the second element of each of them consists of three contacts, of which those belonging to the switch 12 are respectively connected to one end of three banks of resistance 15, 16, and 17, the second ends of all of said resistance banks being directly connected together. The three contacts belonging to the second element of the switch 13 are respectively connected to points intermediate the ends of the three resistance banks, while the three contacts of the second element of the switch 14 are directly connected together.

The switch 12 is actuated by a solenoid 18 and the switches 13 and 14 are likewise respectively actuated by other solenoids 19 and 20. One end of each of the solenoid windings is connected to a conductor 21 leading therefrom to one of the line conductors inside of the main line switch 22, and these three solenoids are respectively provided with auxiliary switches 23, 24, and 25, whose parts are so arranged that they are open as long as their solenoids are deenergized, but are closed by the closure of the switches 12, 13, and 14. The flow of current for energizing these solenoids is controlled primarily by a master switch 26 as hereafter described.

Interposed between the line switch 22 and the motor leads A—A', B—B', are three double pole switches 31, 32 and 33, so constructed as to be closed by energization of solenoids 34, 35, and 36 respectively. It may be noted that the two switches 31 and 32 constitute the reversing means for the motor, inasmuch as by them, the connection of the line conductors $A^2$ and $A^3$ would be reversed relatively to the motor leads A and A'. For this purpose the line conductor $A^2$ is connected to the contact 37 of the switch 31, as well as to a contact 38 of the switch 32, and similarly the line conductor $A^3$ is connected to a contact 39 on the switch 31, and also to a contact 40 of the switch 32. The two contacts 37 and 39 constitute one element of the switch 31, while the contacts 40 and 38 likewise constitute an element of the switch 32; the second element of this latter switch consisting of a pair of contacts 41 and 42, while the second element of the switch 31 is formed by a pair of contacts 43 and 44. Of these, the contacts 43 and 41 are connected together and to the motor lead A, while the contacts 44 and 42 are similarly connected to each other and to the motor lead A' belonging to the same phase of the supply circuit. The switch 33 has the two contacts 45 and 46, forming one of its elements, respectively connected to the line conductors $B^2$ and $B^3$, and the contacts 47 and 48, forming its other element, respectively connected to the motor leads B and B'. The braking switches of the motor are indicated at 49 and 50 and are respectively operated by two solenoids 51 and 52. These switches are likewise of the double-pole form and the two contacts 53 and 54, forming one element of the switch 49, are respectively connected to the two motor leads B' and B, while the contacts 55 and 56 of the switch 50 are respectively connected to the motor leads B and B'. The second element of the switch 49 is formed by two contacts 57 and 58. The first of these contacts, 57, as well as the contact 59 of the second element of the switch 50, is directly connected to the brush 7 operative on the commutator 5, and the contact 58 with the contact 60 of the second element of the switch 50, is connected through a solenoid 61 to the second commutator brush.

The core of this solenoid carries a blade which under the action of gravity, connects a pair of contacts 62 and 63 as long as the solenoid 61 is deenergized.

The solenoid winding 34, in addition to controlling the operation of the switch 31, controls the operation of two auxiliary switches whose movable members are connected to its core in a suitable manner; the arrangement being such that one of the switch blades carried by said core is designed to electrically connect a pair of contacts 64 and 65, under the action of gravity, whenever the winding 34 is deenergized. The blade of the second switch is so mounted on the core that it electrically connects two other contacts 66 and 67 only when the winding 34 is energized. Similarly each of the cores of the two switches 32 and 33 has attached to it a pair of switch blades, of which one of those belonging to the switch 32 connects the contacts 68 and 69 when the winding 35 is deenergized and the other connects the contacts 70 and 71 when current flows through said winding. Similarly, one of the blades controlled by the solenoid winding 36 connects the contact 72 to the contact 73 when said winding is deenergized, while the other blade connects the two contacts 74 and 75 when said solenoid is supplied with current. The windings of the solenoids belonging to the switches 49 and 50 each likewise controls an auxiliary switch, the first having contacts 76 and 77 and the latter having contacts 78 and 79, together with movable members so connected to the cores of the solenoids that the switches are closed under the action of gravity whenever the windings are deenergized. In addition to the above solenoids a winding 80 is provided which is connected in circuit between the conductor 21 and one of the contacts of the auxiliary switch 25; this latter being in series with the two auxiliary switches 23 and 24, the first of which is connected to a conductor 81 leading from the auxiliary switch contact 75. This winding 80 operates two switches, of which the first is provided with two contacts 82 and 83 designed to be electrically connected by a suitable member when the winding is deenergized, and the second has a pair of contacts 84 and 85 similarly connected when current flows through the said windings.

For governing the operation of the above described apparatus, I provide a pilot switch 26 consisting of a movable element 27, which in one position is capable of connecting a pair of contacts 28 and 29 and in the other position connects a pair of contacts 30 and $30^a$. Of these the contacts 28 and 30 are connected to a line conductor $A^3$ while the contact 29 is connected through a conductor 86 to the auxiliary switch contacts 64, 70, and 77. The pilot switch contact $30^a$ nected to the auxiliary switch contacts 79. One end of the solenoid winding 36 belonging to the switch 33 is also connected to the line conductor $A^3$, and the second end of said winding is connected to the two switch contacts 83 and 85 controlled by the winding 80. One end of each of the solenoids 34 and 35 is likewise connected with these two contacts 83 and 85, while the second end of the winding 34 is connected to the auxiliary contact 69 belonging to the other winding 35. The second end of this winding is similarly connected to the auxiliary contact 65, whose supply of current is controlled by the said winding 34.

The auxiliary switch contact 67, in addition to being connected to the auxiliary contact 71 of the switch 32, is likewise connected to the auxiliary contact 74 of the switch 33. While the contact 72 of the switch 33 is connected through the conductor 21 to the line conductor $A^2$, the second contact 73 of this same switch is connected to one end of each of the solenoid windings 51 and 52. One end of the winding of the first of these solenoids is connected to one of the contacts 78 controlled by the solenoid 52 whose second end is in turn connected to the contact 76.

With this arrangement of parts, if the line switch 22 be closed so as to supply two phase alternating current to the line conductors $A^2$, $A^3$, $B^2$, $B^3$, current will at once flow from the conductor $A^3$ through the solenoid winding 36, through the normally closed switches 82—83 and 62—63, to the conductor 21 and so to the line conductor $A^2$. The result of such flow is to energize the winding 36 and close the two pairs of contacts of the switch 33; the auxiliary switch 74—75 being also closed and the auxiliary switch 72—73 opened, whereafter current is free to flow from the line conductor $B^2$ through the contacts 45 and 37 of the switch 33, to the motor lead B, one of the stator windings of the motor, thence out through the motor lead $B'$, contacts 48 and 46 of the switch 33, to the line conductor $B^2$. If now the movable member of the pilot switch be so moved that the contact 27 electrically connects the contacts 28 and 29, current is free to flow from the line conductor $A^3$ through contacts 28, 27, and 29, conductor 86, and auxiliary switch contact 64, through the blade engaging the same to the auxiliary contact 65, the solenoid winding 35, through the connected contacts 83—82, and 63—62 to conductor 21 and line conductor $A^2$. As a result the switch 32 is closed, the contact 41 engages the contact 40 and the contact 42 engages the contact 38.

The closure of the switch 32 connects the motor leads A and $A'$ through the contacts 41 and 42, 40 and 38 to the line conductors $A^2$ and $A^3$, with the result that the current is delivered from these latter to the second phase winding of the stator. At the same time, it is noted that the closure of the switch 32 causes closure of the switch 70—71, so that the current flows from the conductor 86 through this switch, the switch 74—75 which was heretofore closed by the energization of the winding 36, the solenoid winding 18, the conductor 21 and thence to the line conductor $A^2$. The consequent closure of the switch 12 causes starting of the motor 1 with all of the three banks of resistance in circuit with the armature windings through the brushes 9, 10, and 11 and slip rings 2, 3 and 4; it being noted that the delivery of current to the leads $A$—$A'$ causes energization of the winding 8 and a raising of the brushes 6 and 7 from the commutator.

The closure of the switch 12 results in the closure of the auxiliary switch 23, so that the winding 19 is connected between the conductors 81 and 21, whereupon the switch 13 is closed and one-half of each bank of resistance is cut out of the armature circuit. Since the closure of the switch 13 likewise causes closure of the switch 24, current is delivered to the solenoid winding 20, which in turn causes closure of the switch 14 and the direct short circuit of the armature windings through the slip rings and their brushes.

The final closure of the auxiliary switch by the energization of the winding 20 permits current to flow to the solenoid winding 80 and thence through the conductor 21, so that this latter closes the switch 84—85 and immediately thereafter opens the switch 82—83. These two switches are associated with the switch 62—63 in the peculiar manner illustrated in Figs. 2 and 3, and the movable element 90 of the switch 82—83 is likewise of special construction, for it carries some form of retaining device whereby it is held in an open position until released therefrom by movement of the core of the solenoid 61, when this latter winding is energized. For this purpose I may provide any suitable device such as a spring piece 92 mounted on a sleeve $92^a$ slidable on the core of the solenoid 80, and this piece, when the movable member 90 of the switch 82—83 is in its open position, frictionally engages two fixed posts 93 and 94 so as to hold said movable member away from the contacts 82—83. Said sleeve is moved upwardly with the core by means of a collar or the like fixed thereon and it is attached to one arm of a suitably supported lever 95 whose second arm is slidable on the core or other movable part associated with the winding 61 in such manner that the upward movement of said core, through a collar fixed thereon, moves the sleeve $92^a$ and forces the spring catch 92 out of engagement with its two posts 93 and 94, although said core is free to remain in its lower position corresponding to a closed condition of the switch 62—63 regardless of the position of said lever 95. As a consequence of this arrangement, when the winding 80 is energized, the movable member of the switch 82—83 is moved to its open position and is held there independently of the core of the solenoid and of the blade which connects the two contacts 84—85.

The closure of the switch 32, by delivering current to the motor leads A and A', causes energization of the winding 8 and therefore raises the brushes 6 and 7 off of the commutator 5 immediately before the motor starts, so that said motor, after the operation above described, may be considered as working at full speed with the pilot switch 26 in its forward position, the switches 32 and 33 closed, the brushes raised from the commutator, all resistance cut out of the armature circuit, and the solenoid 80 energized. If now the pilot switch 26 be moved through its off position to a position in which its contact 27 electrically connects the contacts 30 and 30ª, current is cut off from the winding of the solenoid controlling the switch 32 and by reason of the opening of the auxiliary switches 70—71 and 74—75, it is likewise cut off from the three windings 18, 19 and 20. The switches 32, 12, 13 and 14 are thus at once opened and following them the switch 33 is likewise opened; this later action of said switch being due to the fact that current is not cut off from the winding 36 of said switch until the solenoid 80 has been deënergized by the opening of the auxiliary switches 23, 24, and 25. The armature of the motor under these conditions would be turning under its own momentum, although immediately upon the opening of the switch 32, the cutting off of current from the solenoid winding 8 would permit the brushes 6 and 7 to drop into engagement with the commutator 5. At the same time current is free to flow from the line conductor A² through the pilot switch contacts 30, 27 and 30ª, auxiliary switch 78—79, solenoid winding 51 and auxiliary switch 72—73, to the line conductor A², so that the switch 49 is closed. The motor is thus short circuited on itself and caused to build up as a direct current generator, since it is to be noted that current is free to flow from the commutator 5 to the brush 7, through the switch contacts 57 and 53 and the motor lead B', thence through one of the stator windings of the motor, out by the motor lead B, through contacts 54 and 58, winding 61 and back to the commutator through the brush 6. Since the two brushes 6 and 7 engaging the commutator are set at what corresponds to the neutral point of the stator winding connected to the leads B—B', this generator action takes place with certainty and causes the well known dynamic braking action to the motor and to the apparatus connected thereto, which shortly results in bringing the moving parts to rest. Before this occurs, however, the flow of current generated by the motor energizes the winding 61, thus opening the switch 62—63, and through the medium of the lever 95, causing the spring piece 92 to be freed from its holding posts 93—94, and thereby permitting closure of the auxiliary switch 82—83. The various switches are now all in position ready to deliver current from the line to turn the armature of the motor in a direction the reverse of that in which it was turned when the pilot switch was first closed, except that the open auxiliary switch 62—63 prevents current from flowing through the solenoid winding 36 of the switch 33 and also except the switch 49 which is still closed. As soon, however, as the direct current generated by the motor has died down to a predetermined low point owing to the coming to rest or reduction in speed of the moving armature, the consequent deënergization of the solenoid 61 permits closure of the switch 62—63 so that current is free to flow from the line conductor A³ through the solenoid winding 36 as first described. However, before the switch 33 can be closed by the energization of the solenoid 36, the switch 72—73 is opened, with the result that current is cut off from the winding 51 and the switch 49 is opened. All of the above described operations incident upon the first closure of the pilot switch therefore again occur, except that in this case current flows through the lead connected to the contact 30ª of the pilot switch so that the solenoid winding 34 of the switch 31 is energized instead of the winding 35 as heretofore. The relation of the line conductors A² and A³ to the motor leads A' and A is thus the reverse of that previously noted, with the result that the armature of the motor is caused to turn in a direction the reverse of that first noted.

By means of the above described arrangement of parts I am enabled to dynamically brake an alternating current motor of the type noted and at the same time very effectually prevent any possible damage owing to improper connections, since the two solenoid windings 61 and 80 with their associated parts act with certainty to prevent the line current being delivered to the motor as long as it is connected to act as a direct current generator. At the same time the braking action due to the generation of current by the motor is made to occur with absolute certainty, since the brushes 6 and 7 are necessarily brought into engagement with the commutator immediately upon the cessation of the flow of line current to the motor leads A and A' and are so set with relation to the stator winding connected to the leads B and B' as to cause this action.

It is obvious that if it be desired to discontinue the use of the motor after its armature has been brought to rest, the movable member of the pilot switch may be first turned to the reverse position until rotation of the armature has ceased and then be moved to its off or neutral position before the line current is again delivered to the motor.

I claim:

1. The combination of an alternating current motor having a normally inoperative commutator; a pilot switch; means controlled by said switch for connecting said motor to a source of current supply; means including brushes for automatically connecting said commutator in a closed circuit when said motor is cut off from its source of current supply; and means controlled by said pilot switch for removing the brushes from the commutator when alternating current is supplied to the motor.

2. The combination of an induction motor having a normally inoperative commutator connected to its rotor; with a series of switches arranged to automatically connect said commutator in a closed circuit when the current is cut off from said motor.

3. The combination of an induction motor; with means for automatically causing said motor to build up and operate as a direct current generator when it is cut off from its current supply mains; said means including a commutator; brushes therefor; and automatically operative switches for connecting said brushes with the commutator in a closed circuit; with an electromagnet connected to be energized when an alternating current is supplied to the motor, for removing said brushes from the commutator.

4. The combination of an induction motor; means for causing said motor to build up and operate as a direct current generator when it is cut off from the alternating current supply mains; with means for preventing current being supplied from the mains to the motor until the direct current generated by it has fallen to a predetermined point.

5. The combination of an induction motor having a commutator; brushes operative thereon; means for automatically connecting said brushes in a closed circuit with one of the stator windings after the motor has been cut off from its current supply mains; and means whereby said stator winding is disconnected from said supply mains after the other stator winding has been so disconnected.

6. The combination of an induction motor having a commutator connected to its rotor windings and provided with brushes for the commutator; and means for automatically connecting one of the stator windings in a closed circuit with said commutator brushes after said motor has been cut off from its current supply mains; said means including a device for cutting off one of the stator windings from the current supply mains before the other.

7. The combination in a motor controlling system of an induction motor; a pilot switch; a series of electro-magnetic main switches controlled by said pilot switch; a commutator connected to windings on the rotor of the motor; brushes for the commutator; and connections between the brushes and the main switches arranged to cause the commutator brushes to be automatically connected in a short circuit when the motor is cut off from its current supply mains.

8. The combination in a motor controlling system of an induction motor; a pilot switch; an electro-magnetic main switching device controlled thereby for governing the flow of alternating current to said motor; a commutator connected to windings on the rotor of the motor; brushes for the commutator; and electro-magnetic switches also governed by the pilot switch for automatically connecting the commutator brushes in a closed circuit when the main current supply switches have been opened.

9. The combination in a motor controlling system of an induction motor; a pilot switch; an electro-magnetic main switching device controlled thereby for governing the flow of alternating current to said motor; a commutator connected to windings on the rotor of the motor; brushes for said commutator; electro-magnetic switches also governed by the pilot switch for automatically connecting the commutator brushes in a closed circuit when the main current supply switches have been opened; and means for preventing closure of said latter switches until the current generated by the motor has fallen to a predetermined point.

10. The combination in a system of motor control of an induction motor having a commutator connected to windings on its rotor and provided with brushes for said commutator; a pilot switch; electro-magnetic main switches for governing the flow of alternating current to the stator windings of the motor; and an electro-magnetic switch for connecting one of the stator windings in a closed circuit with the commutator brushes when the other main switches are open.

11. The combination in a system of motor control of an induction motor having a commutator connected to windings on its rotor and provided with brushes for said commutator; a pilot switch; electro-magnetic main switches for governing the flow of alternating current to the stator windings of the motor; and electro-magnetic switches for connecting one of the stator windings in either of two ways in a closed circuit with the commutator brushes when the main current supply switches are open.

12. The combination in a system of motor control of an induction motor having a commutator connected to windings on its rotor and provided with commutator brushes; a pilot switch; electro-magnetic main switches controlled by said pilot switch for governing the flow of alternating current to the motor; other electro-magnetic switches for connecting the commutator brushes in a closed circuit when the main current supply switches are open; and an electro-magnetic device for insuring opening of the latter switches before the main switches are closed.

13. The combination in a system of motor control of an induction motor having a commutator connected to windings on its rotor and provided with commutator brushes; a winding in circuit with one of the current supply mains having means for holding the brushes out of engagement with the commutator as long as current is supplied to the motor; means for automatically connecting the commutator brushes in a closed circuit with one of the stator windings when the motor is cut off from its source of current supply; and means for preventing the current flowing to the motor when its brushes are so connected.

14. The combination in a system of motor control, of a motor; electromagnetic switching mechanism for controlling the flow of current to the motor; a pilot switch for governing the switching mechanism; said mechanism including two electromagnetic switches, of which one has means for retaining its movable element in the position given it by the energization of its winding and the second switch includes a device for releasing said element when its winding is energized.

15. The combination in a system of motor control, of a motor; electromagnetic switching mechanism for controlling the flow of current to the motor; a pilot switch for governing the switching mechanism; said mechanism including two solenoids, one having means for retaining its blade in an open position independently of the core; with a device for causing the other solenoid, when it is energized, to release said retaining means.

In testimony whereof, I have signed my name to this specification, in the presence of two subscribing witnesses.

LOUIS J. LINGO, Jr.

Witnesses:
WILLIAM E. BRADLEY,
WM. A. BARR.

---

Copies of this patent may be obtained for five cents each, by addressing the "Commissioner of Patents, Washington, D. C."